April 21, 1953

J. J. L. POURADIER ET AL 2,635,463

APPARATUS FOR MEASURING AND RECORDING VARIABLE QUANTITIES

Filed June 25, 1948

JACQUES J. L. POURADIER
ANDRÉ J. DUBOIS
INVENTORS

BY
ATTORNEYS

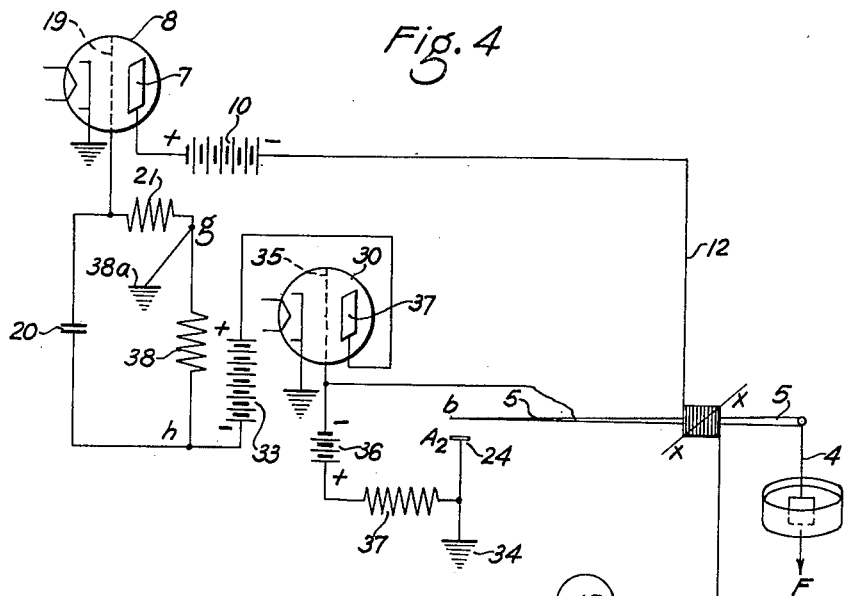
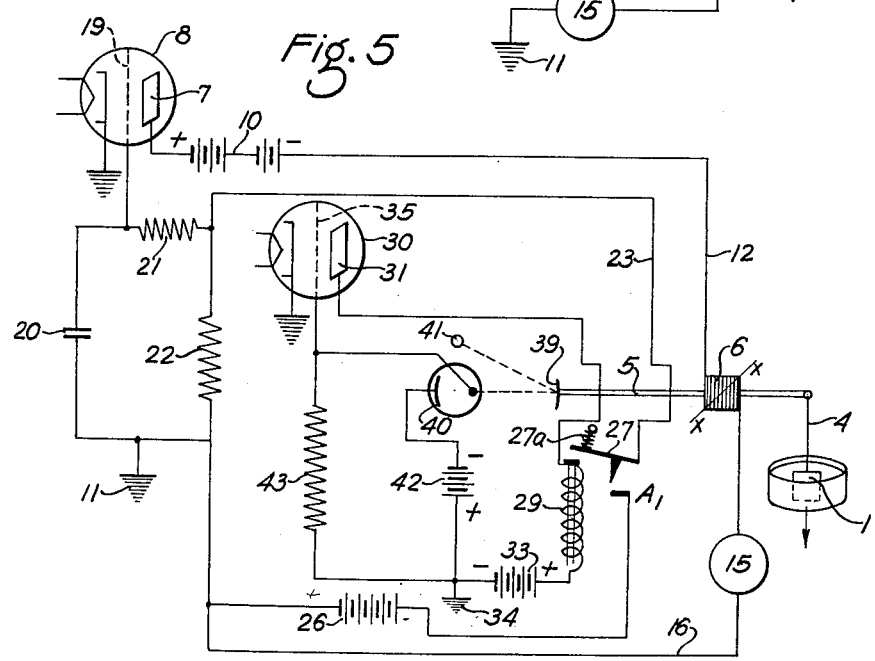
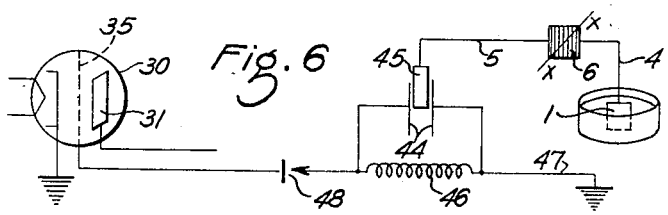

Patented Apr. 21, 1953

2,635,463

UNITED STATES PATENT OFFICE 2,635,463

APPARATUS FOR MEASURING AND RECORDING VARIABLE QUANTITIES

Jacques Jean Louis Pouradier, Bourg-la-Reine, and André Jacques Dubois, Bessancourt, France, assignors to Eastman Kodak Company, Rochester, N. Y., a corporation of New Jersey Application June 25, 1948, Serial No. 35,248
In France July 8, 1947

1 Claim. (Cl. 73—53)

This invention relates to mensuration and particularly to apparatus for studying and recording changes of a variable quantity.

This improved apparatus is utilized in a process of the known type in which a mechanical couple is formed with the quantity to be examined, said couple being balanced with an electromagnetic couple, the variations of which are recorded; these are equal to those of the examined quantity multiplied by a constant factor.

The apparatus hitherto employed for carrying this known process into effect, comprise, in combination, an electromagnetic balance, the movable element of which, e. g. an arm or beam, is subjected in one direction to the action of the quantity to be examined, and in the opposite direction, to the action of an opposing electromagnetic couple; it further comprises means for varying the electric current, creating this opposing couple as a function of the variations of quantity to be measured and finally, means for recording the variations of said current.

In the known apparatus, the means for varying the electric current creating the electromagnetic couple are usually provided by a motor, the starting and stopping of which, being controlled by the needle of the arm, actuate a rheostat which regulates the intensity of the above mentioned electric current. The inertia of such means is very large.

The improved apparatus for carrying this process into effect is characterized by the fact that it comprises, in combination with an electromagnetic balance, subjected in one direction to the action of the quantity to be examined and in the other direction, the action of an opposing electromagnetic couple, an electronic assembly, consisting of at least one valve and the output circuit of which is connected to a movable frame of said balance, said frame creating said opposing couple, and is further connected to a recording apparatus, while the input grid is connected to a circuit, the bias of which is variable by means controlled by the arm or equivalent member of the balance.

The improved apparatus according to the invention has the very great advantage of having practically no inertia, thus enabling the variations of the quantities under consideration to be examined with extreme accuracy.

The invention has also for its object the various uses of the improved apparatus, particularly for the study of surface tensions by the Dognon-Abribat method, the degrees of sedimentation in a suspension, granulometry, swellings, evaporation, adsorption, degree of humidity, etc. The method of immersing the plate for the measurement of surface tension is described in detail by A. Dognon and M. Abribate in an article entitled "Dynamometrie superficielle des solutions" in the "Bulletin de la Societe de Chimie Biologique, vol. XXIII No. 1-3 January-March 1941 pages 63–73."

Other objects and advantages will be apparent from the following description when read in connection with the accompanying drawing in which:

Figs. 3 to 5 are modified circuit diagrams incorporating the invention; and

Fig. 6 is a partial view of another modification.

Figure 1:
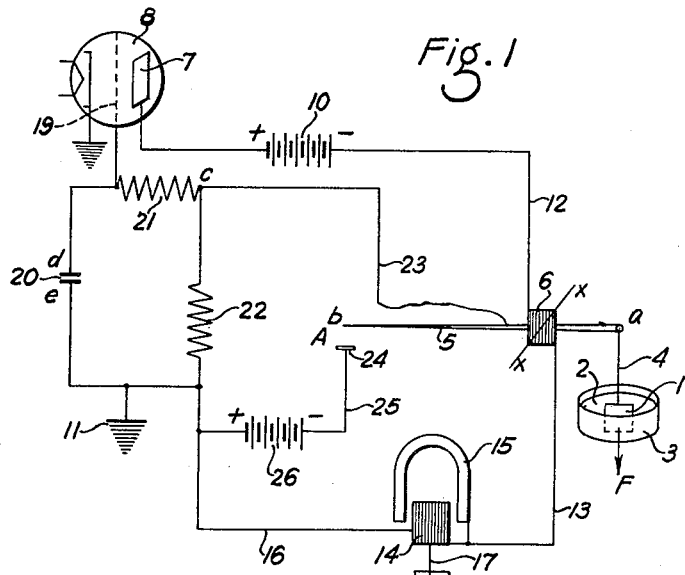
Fig. 1 is a circuit diagram of one apparatus for practicing the invention.

According to the embodiment shown in Fig. 1, the apparatus is intended, for example, for the study and recording of variations in surface tension of a liquid. To this end, the apparatus comprises a matte plate or leaf 1 which dips into the liquid 2 being studied and contained in tank 3. This plate 1 is fastened by a wire 4 to one end of a needle 5. This needle 5 is rigidly secured to an electromagnetic coil 6, the assembly being mounted to oscillate about an axis $x$—$x$ in any well known manner (not shown) either by trunnions, located in bearing blocks, or by knives resting on two bearings. The resultant F of the capillary forces applied to the plate 1 is Al cos $a$, where A is the constant of surface tension of the liquid 2 to be studied, 1 is the length of the line of contact of the liquid and the plate and $a$ is the angle of contact, this angle being zero when the plate is thoroughly wet. The force F tends to immerse the plate 1 to cause the needle 5 to pivot in a clockwise direction (Fig. 1) against the electromagnetic couple of the coil 6.

According to the invention, the coil 6 is in circuit with the anode 7 of an electronic valve 8. This anode 7 is, in effect, connected to the positive pole of a battery 10, the negative pole of which is connected to earth 11 through a lead 12, the coil 6, a lead 13, the coil 14 of a recording milliammeter 15 and a lead 16. The coil 14 is provided with a stylus 17 arranged to move over a recording drum 18 as is well known.

The grid 19 of the valve 8 is connected to earth 11 by a biassing circuit comprising a condenser 20 in parallel with a pair of series-connected resistances, consisting of a high resistance 21 and a low resistance 22. The junction $c$ of these two resistances is connected by a lead 23 to the needle 5 towards the end $b$, opposite to the end $a$ to which is fixed the wire 4. Facing this end $b$ of the needle 5 is a fixed stud 24, connected by a lead 25 to the negative pole of a battery 26, the positive pole of which is earth at 11, the assembly ($b$, 24) forming a switch A.

The coil 6 is so arranged that the anode current, traversing it, creates in said coil 6 a couple which opposes that produced on the arm 5 by the surface tension or other quantity to be measured, this taking place in such a manner that when the two couples are equal, the switch A between the end $b$ of the needle and the stud 24 is closed.

Simply by way of example, the different values in the case of a three-electrode valve of the type 6J5, may be as follows:

Battery 10_____ approx. 150 volts
Battery 26_____ approx. 30 volts
Condenser 20_____ 32 microfarads
Resistance 21_____ 30 megohms
Resistance 22_____ 2 megohms The operation is as follows: It is first assumed that the factor F to be measured is invariable. When starting a measurement, with the parts connected as shown in the diagram of Fig. 1, the condenser 20 is not charged and the current passing through the coil 6 is too strong to balance the force to be measured and the needle 5 inclines to close the switch A. When the end $b$ of the needle closes the switch A by contact with the fixed stud 24, the battery 26 is connected to the condenser 20 through the resistance 21. Owing to the fact that this is a high resistance, the charging is not instantaneous but follows an exponential law. The plate $d$ of the condenser 20 is connected to the negative pole of the battery 26 and since the plate $e$ is earthed, the plate $d$ is thus at an increasing negative potential and the same applies to the grid 19 of the valve 8. As this grid 19 becomes more negative the anode current through the coil 6 and the opposing couple resulting therefrom decrease and, for a certain value $i-\Delta i$, the force being studied predominates and the switch A is opened.

When the switch A opens, condenser 20 slowly discharges through the series-connected resistances 21 and 22. The plate $d$ of the condenser 20 and also the grid 19 become less negative. The anode current through the valve 8 increases and when it finally reaches a value $(i+\Delta i)$, the electromagnetic couple due to coil 6 predominates and the needle 5, again closes the charging circuit of the condenser 20 through the switch A and the above cycle is repeated.

The anode current passes serially through the coil 6 and the coil 14 and therefore, for a given value F, the current recorded by the ammeter 15 oscillates regularly from $(i+\Delta i)$ to $(i-\Delta i)$ on both sides of the mean value $i$, the frequency of the oscillations being a function of the time constant of the apparatus, i. e. of the charging and discharging speed of the condenser and of the condition of the contact surfaces of the switch A.

If it is now assumed that the magnitude or quantity F takes a new value, the conditions of equilibrium of the system will be changed and the anode current will oscillate around a new value $i'$, i. e. between $(i'-\Delta i)$ and $(i'+\Delta i)$.

For another value of F, there will also be a variation of anode current between $(i''-\Delta i)$ and $(i''+\Delta i)$.

It will thus be seen that the mean value of the current takes the different values $i$, $i'$, $i''$ (Fig. 2) with the values of F and the broken line $rstuvw$ (Fig. 2) gives as an approximate constant the variation to be studied of the factor F (in ordinates) in relation to the time T (in abscissae).

As $\Delta i$ can be made very small by regulating the time constants and by having good contacts (for example $\frac{1}{1000}$ of $i$), the recording instrument actually gives almost directly the required line $rstuvw$. (The variations $\Delta i$ have been considerably exaggerated in the diagram of Fig. 2; in actual fact, one obtains practically the required line.)

Instead of directly controlling the charging and discharging of the condenser 20 by the contact A, formed by the end $b$ of the needle of the electromagnetic balance and the fixed stud 24, there may be provided, in addition to the first-stage valve, a second valve having several electrodes, controlling the charging of the condenser 20 through a relay, this arrangement having the advantage that the charging current of the condenser 20 does not pass through the contact A, the electric resistance of which depends on the condition of the surfaces and the force with which the needle is applied to the fixed stud 24.

Figure 3:
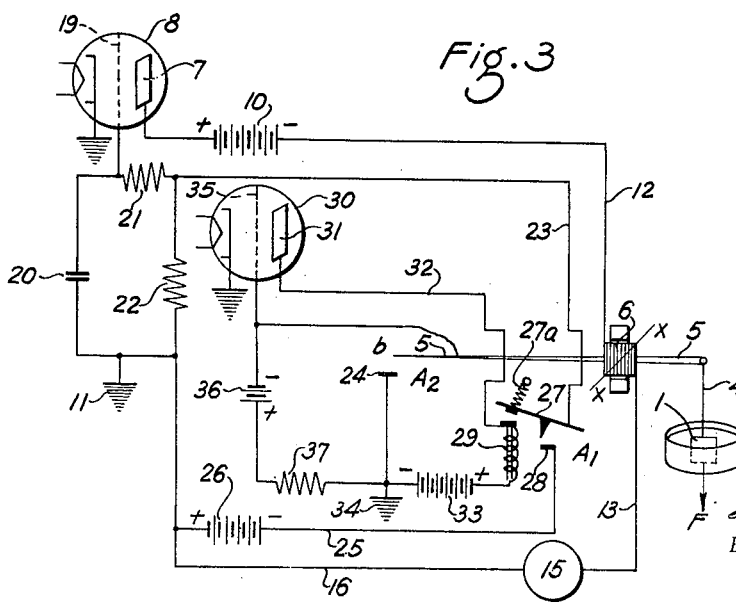

Such an arrangement is illustrated in Fig. 3. The switch $A_1$, which is in the grid circuit of the valve 8, is independent of the needle 5. It is formed between an oscillating armature 27 and a fixed stud 28. This movable armature 27 is moved against the action of a return spring 27$a$ by means of a relay, the coil 29 of which is in the anode circuit of a second electronic valve 30. The anode 31 of this valve is connected by a lead 32 and through the relay winding 29 to the positive pole of a battery 33 which is earthed at 34. The grid 35 of this valve is negatively biassed by a battery 36, connected to earth through a series resistance 37. The battery 36 and the resistance 37 are shunted by a switch $A_2$, formed by the end $b$ of the needle 5 and the fixed stud 24.

In order to give a general idea, using a valve 30 of the type 6J5, the following values will be taken:

Battery 33_____ approx. 130 volts
Battery 36_____ approx. 5 volts
Resistance 37_____ approx. 2 megohms It will be seen that when the switch $A_2$ is closed, the grid 35 of the valve 30 is connected directly to earth at 34 and consequently has a zero potential. In these circumstances, the valve 30 discharges a certain anode current through the coil 29 of the relay which attracts the armature 27 to close the switch $A_1$. On the contrary, as soon as the switch $A_2$ is opened, the grid 35 is only connected to earth 34 through the battery 36 and the resistance 37, the bias of the grid 35 thus becoming negative. The anode current is lowered and the armature 27 is retracted by its spring 27$a$ and the switch $A_1$ opens.

The result given with the recording apparatus 15 is the same as in the example of Fig. 1.

In another form of the invention, illustrated in Fig. 4, the relay of the preceding example is dispensed with, and the difference in potential formed between the terminals of a resistance 38 (of the order of 3,000 ohms), connected in series with the battery 33 in the anode circuit of the valve 30 of the first stage is used for the charging of the condenser 20 in the grid circuit of the valve 8.

This anode circuit comprises the battery 33, the resistance 38 and the earth 38$a$ in series with the anode 37. The resistance 21 connects the grid 19 to earth at g. One plate of the condenser 20 is connected to the grid 19 and the other plate to the point h between the battery 33 and the resistance 38. The biassing circuit of the grid 35 of the valve 30 is the same as described in connection with Fig. 3.

In these circumstances, the closing of the switch A2 grounds the grid 35, the anode circuit of the valve 30 then being the source of a certain current. This current creates a potential drop across the terminals of the resistance 38, i. e. between the point h and the earth at 38a, thus causing the charging of the condenser 20. If, on the contrary, the switch A2 is opened, the grid 35 is rendered negative by means of the battery 36 to stop the anode current through the valve 30 and the condenser 20 is discharged through the resistances 21 and 38.

The closing of the switch A2 may be effected optically instead of mechanically as in the foregoing arrangements, for example in the manner shown in the arrangement according to Fig. 5, which relates to a circuit similar to that of Fig. 3.

According to this example, a mirror 39 fixed to the arm 5 of the electromagnetic balance having a coil 6, reflects the light emitted by a source 41 to a photoelectric cell 40 except when the couple due to the coil 6 predominates. This cell 40 is mounted in the circuit of the grid 35 of the first triode valve 30. The two elements of this cell are earthed at 34 through a battery 42 of about 10 volts and a resistance 43 of about 100 megohms, respectively.

The operation is similar to that in the example of Fig. 3. In fact, when the pencil of light falls on the cell 40, the latter emits a current passing through the resistance 43, creating at the terminals a potential difference which, when applied to the grid 35 of the valve 30, biasses it negatively; the arrangement is then according to the form shown in Fig. 3.

Figure 2:
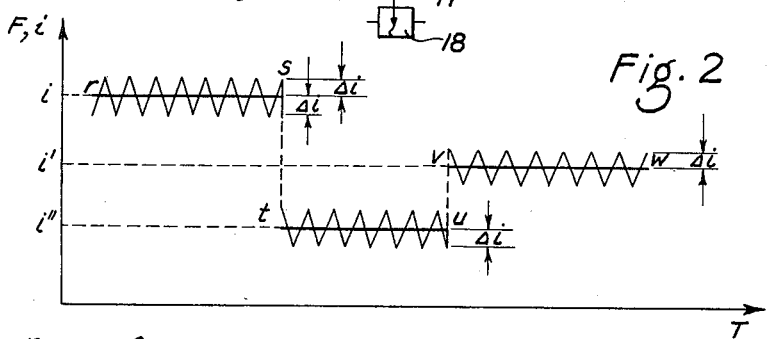
Fig. 2 is a diagram, showing the recording obtained by the apparatus of Fig. 1.

Instead of using an optical means or a mechanical switch A2, any means for producing a variation of self-induction and/or capacity in an oscillating circuit can be used, always provided that sufficient screening precautions are taken to avoid the influence of these circuits on the rest of the wiring system. For example, in the case of a variable capacity (Fig. 6), the switch A2 of the examples in Figs. 2 and 3, is replaced by the oscillation of a movable element 45, secured to the arm 5 of the balance between the two plates of a condenser 44.

The condenser 44 is in parallel with a self-inductance coil 46 in an oscillating circuit of stabilized frequency 47, being connected through a rectifier 48 to the grid 35 of the valve 30 of the first stage.

As will be understood, any variation in the position of the arm 5 of the balance will result in a variation in the oscillation amplitude of the current in the circuit 47, and the variation of the rectified current will cause a change in the bias of the control grid of the valve 30, the anode circuit of which controls the relay 29 as in the preceding examples.

The invention is, of course, not limited to the arrangements illustrated and described, which are given by way of example only.

Finally, in all the examples as described, the main valve may be replaced by several valves in series, the variable bias being applied to the first valve and the anode current intended for the electromagnetic balance and for the recording device, being taken from the last valve.

We claim:

In measuring apparatus the combination comprising an electromagnetic balance including an oscillatable member movable in one direction by the movement of a couple derived from a quantity to be measured and in the other direction to a predetermined position by an opposing electromagnetic couple, means for recording said quantity to be measured in terms of current supplied to said electromagnetic balance, an electronic assembly comprising at least one valve, the output anode of said valve being connected in series circuit to a source of potential, said electromagnetic balance, and said recording means for normally passing sufficient current through said electromagnetic balance to rotate said oscillatable member in opposition to the couple provided by the unknown quantity, a biasing circuit connected to the control grid of said valve and adapted to regulate the anode current supplied to said electromagnetic balance by said valve when said oscillatable member is in said predetermined position and including a normally-open switch means, a condenser in parallel circuit with a high and low resistance in series circuit and having one plate thereof directly connected to ground, and a source of potential for charging said condenser upon closure of said switch means, said high resistance being in series circuit with said switch means and said source of potential and said resistances providing a discharge path for said condenser, an auxiliary electronic assembly for controlling said biasing circuit including at least one valve and a relay adapted to close said switch means, said second valve means having its anode in series circuit with said relay and a source of potential connected to ground and its control grid biased by a source of potential connected to ground through a series resistance, and switching means including said oscillatable member when in said predetermined position for shunting the control grid circuit of said second valve to energize said relay for closing said switch means and rendering said biasing circuit operative until the couple provided by the unknown quantity prevails to move said oscillatable member from said predetermined position to render said auxiliary electronic assembly inoperative, the frequency of movement of said oscillatable member to and from said predetermined position being determined by the time constant of said condenser and its resistance discharge path.

JACQUES JEAN LOUIS POURADIER.
ANDRÉ JACQUES DUBOIS.

References Cited in the file of this patent

UNITED STATES PATENTS

| Number | Name | Date |
|---|---|---|
| 1,855,205 | Schur | Apr. 26, 1932 |
| 1,960,224 | Schoenberg | May 22, 1934 |
| 2,067,741 | Weckerly | Jan. 12, 1937 |
| 2,112,682 | Ryder | Mar. 29, 1938 |
| 2,117,894 | Lenehan | May 17, 1938 |
| 2,141,175 | Dawson | Dec. 27, 1938 |
| 2,360,751 | Ziebolz | Oct. 17, 1944 |
| 2,371,040 | Fisher et al. | Mar. 6, 1945 |
| 2,383,757 | Ziebolz | Aug. 28, 1945 |
| 2,491,998 | Mikina | Dec. 20, 1949 |
| 2,511,752 | Tandler et al. | June 13, 1950 |

FOREIGN PATENTS

| Number | Country | Date |
|---|---|---|
| 862,252 | France | Nov. 30, 1940 |